United States Patent [19]

Stein et al.

[11] Patent Number: 5,748,927

[45] Date of Patent: May 5, 1998

[54] GRAPHICAL USER INTERFACE WITH ICONS HAVING EXPANDABLE DESCRIPTORS

[75] Inventors: Michael Victor Stein, San Jose; Paul Richard Wenker, Milpitas, both of Calif.

[73] Assignee: Apple Computer, Inc., Cupertino, Calif.

[21] Appl. No.: 644,370

[22] Filed: May 10, 1996

[51] Int. Cl.$^6$ ..................................................... G06F 3/00
[52] U.S. Cl. ........................... 395/333; 395/348; 395/347
[58] Field of Search .................................. 395/333, 334, 395/347, 348, 349, 354

[56] References Cited

U.S. PATENT DOCUMENTS

| | | | |
|---|---|---|---|
| 5,241,655 | 8/1993 | Mineki et al. | 395/156 |
| 5,436,637 | 7/1995 | Gayraud et al. | 395/159 X |
| 5,564,004 | 10/1996 | Grossman et al. | 395/159 |
| 5,596,704 | 1/1997 | Geddes et al. | 395/348 |

OTHER PUBLICATIONS

M. Levine Young, "Wordperfect 6.1 . . . " 1994, IDG Books, pp. 39–41.

*Primary Examiner*—Raymond J. Bayerl
*Assistant Examiner*—A. Katbab
*Attorney, Agent, or Firm*—Burns, Doane, Swecker & Mathis

[57] ABSTRACT

A graphical user interface for a computer includes an arrangement of icons that provides for a large number of icons to be present on screen while maintaining a large amount of useable screen space. An icon text description setting out the icon's function is provided adjacent to each icon. The icon text description is presented in truncated form when the icon is not designated by a cursor. When the icon is designated by a cursor, the icon text description is expanded to a full length thereby more fully describing the icon's function. When an icon is designated by a cursor, the text descriptions for undesignated icons are blanked, thereby focusing attention on the designated icon. This arrangement has the desirable effect of providing a user with a ready means of identifying or reaffirming icon function while avoiding the consumption of useful screen space.

18 Claims, 7 Drawing Sheets

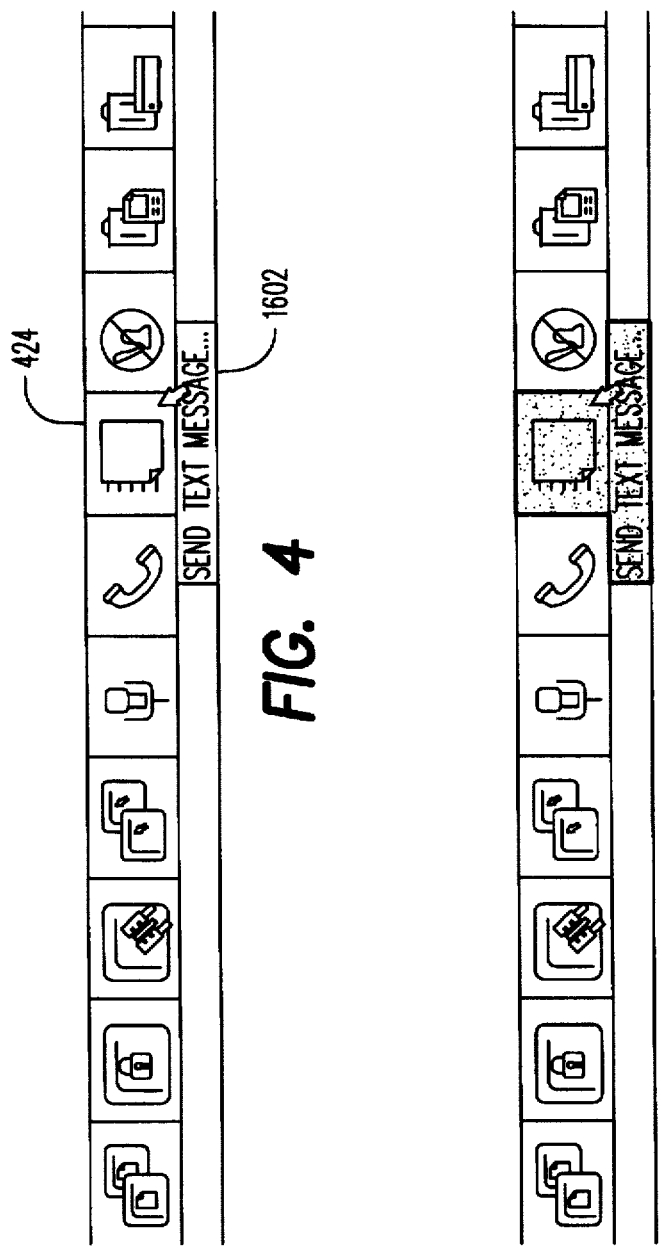

5,748,927

GRAPHICAL USER INTERFACE WITH ICONS HAVING EXPANDABLE DESCRIPTORS

FIELD OF THE INVENTION

The present invention is directed to a graphical user interface for a computer, and more specifically to a graphical user interface that includes a arrangement of icons displayed on a computer screen.

BACKGROUND OF THE INVENTION

As computer applications improve, the number of features available to users has grown dramatically. In graphical user interface (GUI) environments, users can typically access these features by means of icons which are displayed on the screen of a computer monitor. Consequently, as the number of features increases, the corresponding number of icons available to invoke such features also has grown. Unfortunately, applications designers, in order to preserve usable screen space, are constrained in the number of icons that can be presented on screen at any given time. Further complicating matters is the problem of identifying a function associated with a particular icon when large numbers of icons are available.

Consider, for example, administrative control in a multi-media network system. An exemplary multi-media system is depicted in FIG. 1. Referring thereto, the system contains a number of workstations, including a master workstation 100 operated by an administrator, and a multiplicity of other workstations 102 that are accessible to, for example, students. The various workstations are connected to one another by means of a suitable data network 104. The data network 104 enables data to be exchanged between the various workstations.

In the typical classroom or computer laboratory setting, it is desirable to enable the teacher or administrator (hereinafter referred to as "administrator") to perform a variety of tasks directed at monitoring, manipulating and controlling the network workstations. To this end, the administrator can be provided with a variety of tools. These tools can include mechanisms for communicating with network workstations, for downloading applications and files to network workstations, and for observing the activities taking place on one or more network workstations. A widely accepted technique for supplying an administrator with user-friendly tools is to provide access to the tools through a graphical user interface (GUI). In such an interface, the administrator operates a workstation by manipulating an on-screen cursor using a mouse, or other cursor control means, to invoke desired functions by means of icons.

One example of an administrative control screen for the aforedescribed system is depicted in FIG. 2. In the figure, a number of icons are displayed which permit an administrator to invoke supervisory functions. For example, an observe button 76 allows an administrator to view the screen that appears on a selected network workstation. A stop video button 78 permits an administrator to stop a video presentation being displayed on one or more network workstations. An announce button 60 permits an administrator to make an announcement to all of the network workstations, while a talk button 62 allows the administrator to talk to an individual network workstation. The stop audio button 64 terminates the announce or talk functions.

A graphical user interface, such as the one depicted in FIG. 2, is a very effective mechanism for supplying a computer user, such as a network administrator, with a means to operate a computer. However, as more administrative features are made available, corresponding icons cannot be readily displayed because of limited screen space. Hence, the display of such icons, in an arrangement such as that depicted in FIG. 2, must be balanced with the provision of a sufficient amount of on-screen working space.

Another problem associated with the display of a large number of icons is that it becomes difficult for a user to remember the function associated with each particular icon. The icon symbols may not always be readily known to a user. This problem can be remedied, in part, by displaying a text description of the icon function, as shown in FIG. 2. This arrangement further consumes screen space, however, because such icon descriptions may be wider than the icons that are described. Consequently, the icons have to be spread out in order to accommodate the description text. As a result, there is a practical limit to the number of icons that can be simultaneously displayed together with informative textual descriptions.

BRIEF STATEMENT OF THE INVENTION

The present invention provides a graphical user interface in the form of an icon arrangement that addresses the foregoing concerns. In one aspect of the invention, the arrangement of icons consume as little space as possible by preferably arranging the icons proximate one another in an abutting, or nearly abutting manner, for example to form a toolbar. In another aspect, corresponding icon function text descriptions, or portions thereof, are simultaneously displayed within a space that is defined by a width of a corresponding icon.

When a cursor is not placed over any of the icons, only an amount of icon descriptor text is exposed that falls within a limited amount of space allotted to the associated icon. For example, this limited space might be defined by the width of the icon. However, when a cursor is placed over an icon, the icon's descriptor text is accentuated, allowing a user to fully ascertain the function of the icon. In one embodiment of the invention, this accentuation is achieved by expanding the text to provide a more complete description. At the same time, the partial icon text descriptions for the remaining icons are de-emphasized, by blanking or like action, to thereby draw a user's attention to the accentuated icon.

Such an arrangement allows for a large number of icons to be simultaneously displayed on a computer screen along with a corresponding text description, while preserving usable screen space. In addition, a preferably more detailed description of an icon's function can be readily ascertained simply by placing the cursor over a desired icon symbol, whereby a full icon description text is exposed.

An icon arrangement in accordance with exemplary embodiments of the invention allows for enhanced ease of use while still maintaining screen space for use in presenting menus, applications windows, and the like.

These and other features of the present invention, and the advantages offered thereby, are explained in detail hereinafter with reference to specific embodiments illustrated in the accompanying drawings.

BRIEF DESCRIPTION OF THE DRAWINGS

FIG. 4 is an illustration depicting a cursor indictor placed over an icon thereby exposing the full description text for the icon;

FIG. 5 is an illustration depicting the selection of the icon in FIG. 3;

DETAILED DESCRIPTION

To facilitate an understanding of the present invention, its features are described hereinafter with reference to a particular implementation, namely a multimedia computer network that is designed for a classroom or computer laboratory environment, in which a teacher or administrator operates a master workstation, in part, using a toolbar incorporating the invention. It will be appreciated, however, that the practical applications of an arrangement of icons in accordance with the invention is not limited to a network scenario. Rather, an arrangement and operation of icons in accordance with the invention will be found to have utility in any GUI application, whether run in a networked computer, a stand-alone computer, or a remote terminal. As used herein, the term icon is understood to apply to any graphical or non-textual representation of entities including, but not limited to, commands, objects, files, folders, storage media, applications, and the like.

Figure 1:
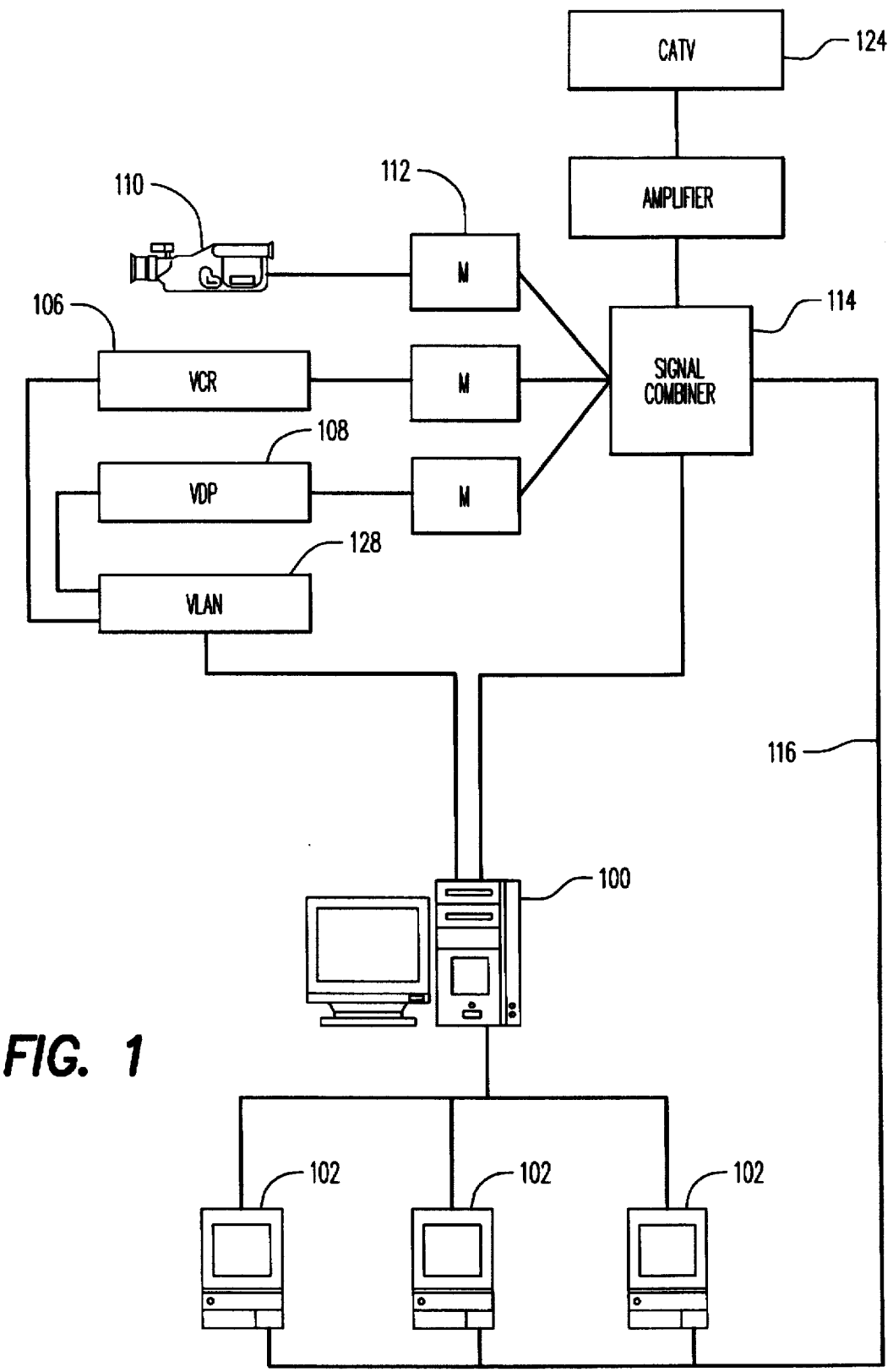
FIG. 1 is a block diagram of the hardware architecture of a networked computer system of a type to which the present invention can be applied.
Figure 2:
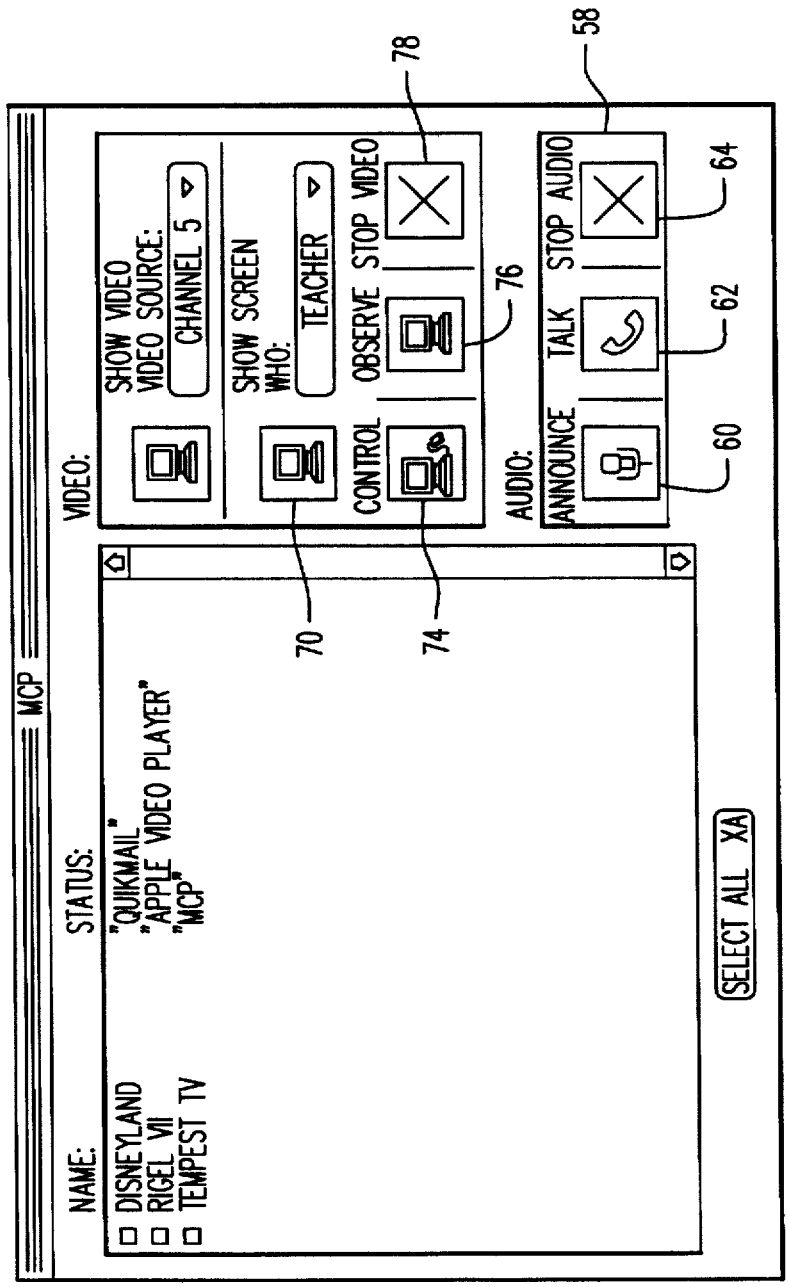
FIG. 2 is a depiction of one example of a graphical user interface screen.
Figure 3:
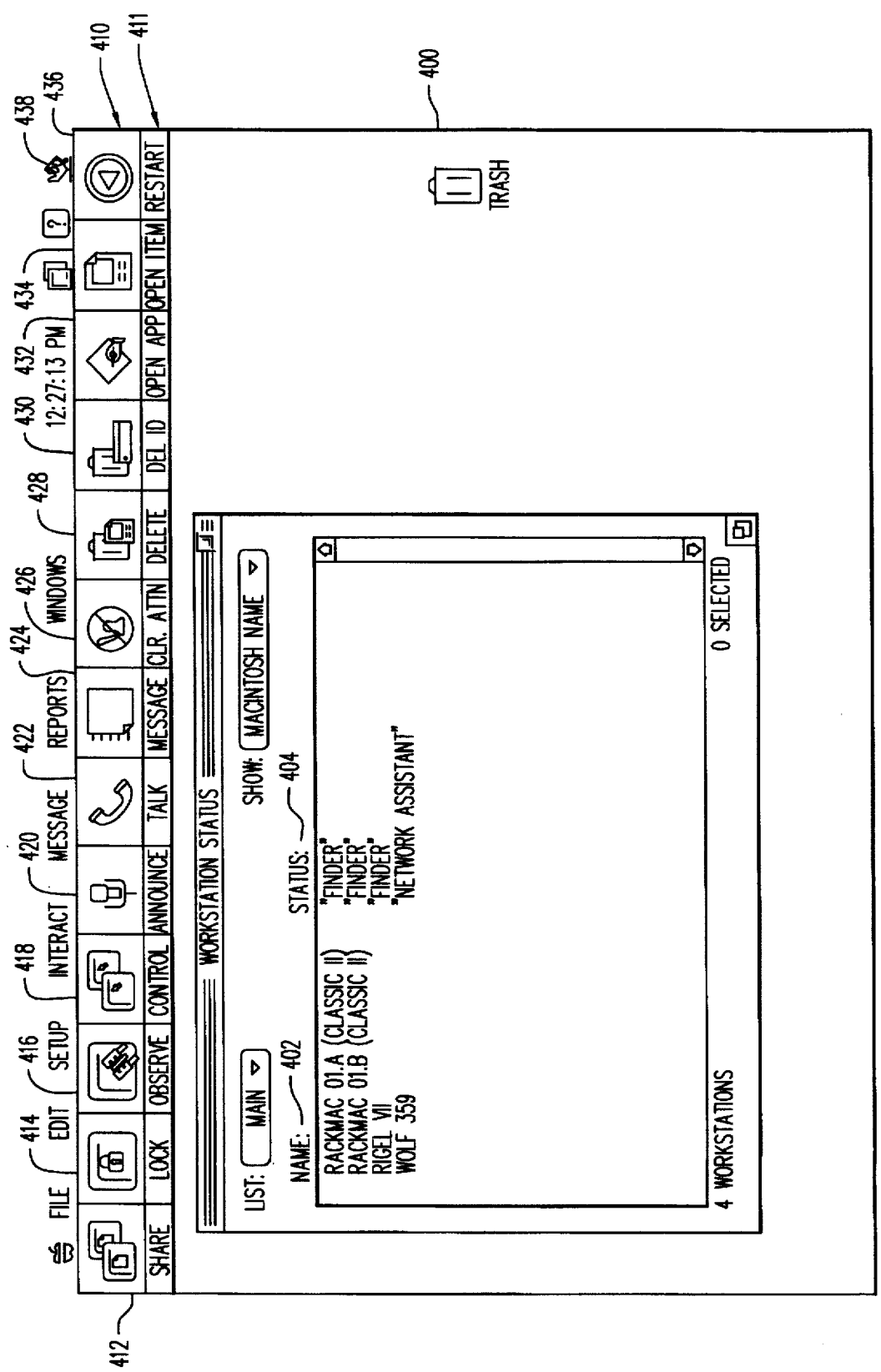
FIG. 3 is an illustration of a display screen showing a toolbar arrangement conforming to an exemplary embodiment of the invention.

An exemplary desktop display 400 for a master workstation 100 is depicted in FIG. 3. This particular display 400 includes an arrangement of icons in the form of a toolbar 410 that is comprised of, for example, thirteen icons in the depicted arrangement. The number of icons that can be simultaneously displayed may be governed by the width of a workstation monitor screen and the size, or sizes, of the various icons. The depicted toolbar 410 contains icons for various administrative functions, such as share screen 412, lock screen 414, observe 416, control 418, announce 420, talk 422, send text message 424, clear attention 426, delete selected item 428, delete hard drive 430, open application 432, open item 434, and restart 436.

Because the icons in the toolbar 410 for the example of FIG. 3 are arranged in a contiguous or nearly contiguous manner, the icon descriptors, in many cases, can overlap or appear to be crowded when the icon function text description is greater than or equal to the width of an individual icon. Consequently, in accordance with one aspect of the invention, the full icon description text, or full icon descriptor, is truncated to an exposed partial text portion, or partial icon descriptor, that can fit within a width defined by an individual icon. The exposed portion of the icon descriptor can be the first portion of icon description text, an acronym, a selected identifying word, any combination of the latter, or anything else that can allude to an icon's function.

In the exemplary arrangement depicted in FIG. 3, the partial icon descriptors are paired with the icon symbols within a space limited by the width of an associated icon. Consequently, the respective partial icon descriptors: Share, Lock, Observe, Control, Announce, Talk, Message, Clr Attn, Delete, Del HD, Open App, Open Item, and Restart appear below the icons. In essence, the string of partial icon descriptors forms an icon description bar 411. In a preferred embodiment, the icon descriptor bar 411 resides directly beneath the toolbar, so that the relationship between an icon and its description can be readily perceived by the user. The icon descriptors, or descriptor bar, can appear above the toolbar, to the right or left of a toolbar in a vertically arranged toolbar, or otherwise adjacent to a toolbar. In an alternative arrangement, individual icons can be paired with individual icon descriptors to form icon/descriptor pairs. In such a situation, the icon descriptors are located in a sufficiently proximate relationship to an associated icon so as to form a logical association therewith. Such icon/descriptor pairs can be arranged in any manner wherein fully expanded descriptor text may be subject to overlapping or crowding. For example, a block arrangement can be formed from multiple rows and columns of icon/descriptor pairs.

When a cursor is positioned over an icon by action of a mouse or other cursor control mechanism, the icon descriptor for the designated icon is expanded to its full text. This has the desirable effect of highlighting, accentuating or otherwise differentiating the designated icon and its expanded descriptor. The differentiation of the designated icon and its expanded descriptor is further accentuated by de-emphasizing the icon descriptors of the other icons, thereby focusing a user's attention on the designated icon and/or its expanded text. As used herein the terms "designated" or "designation" refer to the positioning of a cursor over an icon. Such designation may require the cursor to remain over the icon for a brief period of time before the icon descriptor is expanded to its' full length. Selection of an icon, as referred to herein, occurs when a user presses a mouse button or like mechanism while the icon is designated, to select the icon, or otherwise invoke a function associated with an icon.

Referring to FIG. 4, if a cursor indicator is placed over an icon such as Message 424 for a sufficient period of time (e.g., 0.1 second) to indicate designation of the icon, the partial icon descriptor expands to the full text icon description of "Send Text Message" 1602. The delay in designating an icon avoids undesirable distractions caused by instantaneous designation. For instance, if a user is moving a cursor from a main screen to a menu bar that is located above the toolbar 410, it is undesirable to blank the descriptor bar and expand the icon over which the cursor is passing while the cursor is passing over the toolbar 410. The visual effect brought about by such an affect may be annoying or distracting to a user.

Designation accentuates an icon over which a cursor is placed, thereby focusing a user's attention on the designated icon. Further facilitating the focus on the designated icon is the preferable blanking of partial icon descriptors for non-designated icons. As an alternative, the partial icon descriptors of non-designated icons can be grayed or darkened. Designation permits users to fully ascertain the function of the icon if they are unfamiliar with the icon itself, or with the partial icon descriptor (i.e., "Message"). When the icon is selected by pressing a button on a mouse, for example, the selected icon and icon descriptor are inverted as shown in FIG. 5. Releasing the mouse button while the cursor indicator remains over the icon or expanded descriptor invokes the corresponding function (i.e., the send text message function).

FIGS. 4 and 5 depict an exemplary embodiment of the invention. As shown, when an icon is designated, the text descriptor for the designated icon is expanded and preferably centered beneath the icon symbol. The descriptors for undesignated icons are de-emphasized by blanking, graying, muting, or otherwise downplayed, thereby focusing a user's attention on the designated icon and fully exposed icon descriptor for the designated icon. When a left-most icon in the toolbar is selected, the fully expanded icon descriptor can be left justified. Likewise, when a right-most icon in the toolbar is selected, the fully expanded icon descriptor can be right justified. Justification can, of course, also depend on the length of a particular full icon description text.

Figure 6A:
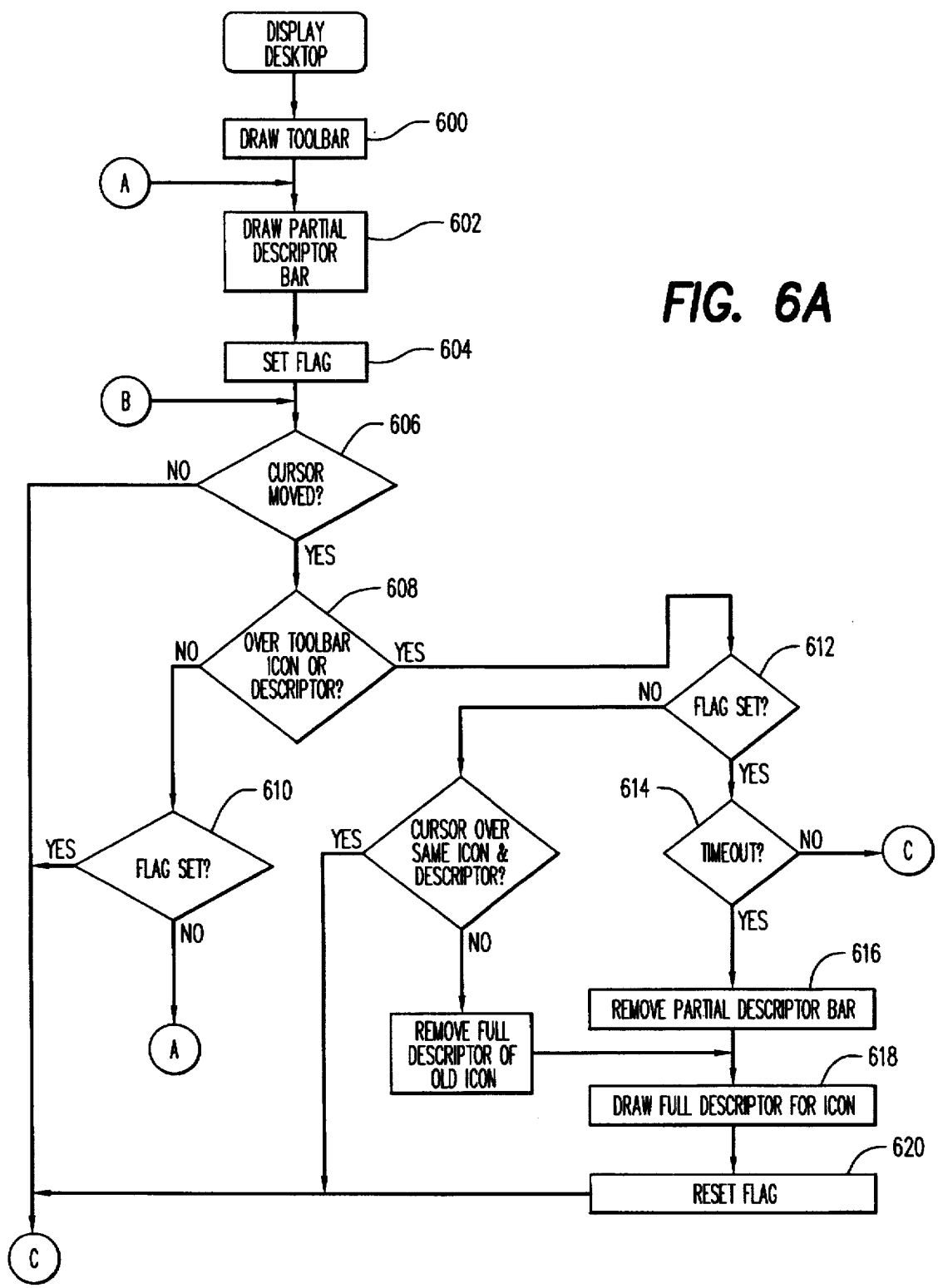
FIGS. 6A and 6B are a flowchart of the process for displaying an exemplary toolbar in accordance with an embodiment of the present invention.
Figure 6B:
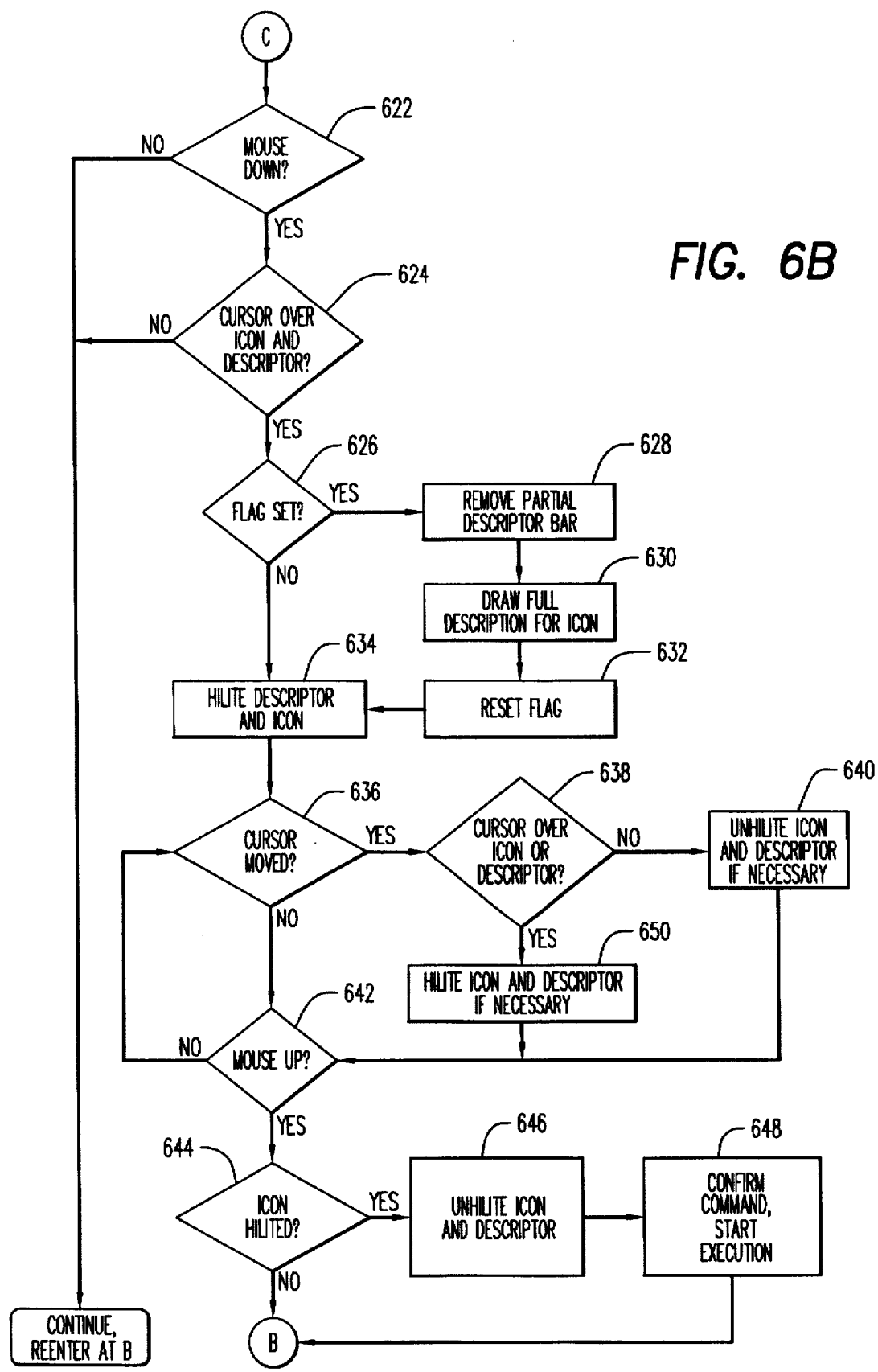

FIGS. 6A and 6B are a flow chart of a procedure that can be employed to control the display of the toolbar in accordance with the present invention. In the disclosed embodiment, this procedure is carried out within the master workstation 100 under the control of the network administration program that is responsible for displaying the desktop 400. In general, the procedure is performed by a computer's operating system or an application program that is responsible for displaying a toolbar or other arrangement of icons.

Referring to FIG. 6A, when a program is launched or other appropriate user action is taken, it may result in a command to display a desktop, or window, associated with the program, such as the desktop 400. In this regard, two of the tasks that are carried out are to draw the toolbar 410 (Step 600) and to draw the partial descriptor bar 411 (Step 602). After these items are drawn, a flag is set at Step 604 to indicate that the toolbar display is in its normal mode. Thereafter, the toolbar display system awaits movement of the cursor. When movement of the cursor is detected at Step 606, a determination is made at Step 608 whether the cursor is positioned over a toolbar icon. If it is not, the state of the flag is checked at Step 610. If it is set, which indicates that the toolbar display was previously in its normal state, the system checks to see if the mouse button is depressed (at Step 622). If it is not, the system continues to (periodically) check for cursor movement at Step 606. Similarly, if the mouse button is depressed but the cursor is not over an icon or descriptor (Step 624), no action is taken with respect to the toolbar display. However, if the flag is not set at Step 610, meaning that the display was not previously in its normal state, the system redraws the descriptor bar at Step 602 and resets the flag at Step 604.

If the cursor is located over a toolbar icon at Step 608, the state of the flag is checked at Step 612. When the cursor is first placed over an icon, a timer is set. At Step 614, a check is made whether a suitable period of time has elapsed, e.g., 0.1 second. If not, the mouse button is checked at Step 622. If, however, the full period elapses and the cursor remains over the icon, the partial descriptor bar is removed at Step 616, and the full text description for the icon is displayed at Step 618, resulting in the state shown in FIG. 4. The flag is reset at Step 620, to indicate that a toolbar icon descriptor is in its expanded mode.

Subsequently, if the user depresses the button on the mouse (at Step 622) a check is made to determine whether the cursor is still over the descriptor-expanded icon (or the icon's expanded text) at Step 624. If the cursor is no longer over the icon or its descriptor, the mouse button down condition is handled by other routines (not depicted in FIG. 6) and control reenters at Step 606. If the cursor remains over the icon or its descriptor at Step 624, the flag is checked at Step 626 to determine whether the partial icon descriptor is still displayed. If so, the partial descriptor bar is removed and the full icon descriptor is displayed at Steps 628 and 630, respectively. The flag is then reset at Step 632. This covers the situation where a user moves the cursor over an icon and depresses a mouse button before a designation timeout occurs at Step 614. Regardless of the decision at Step 626, the icon is highlighted, or inverted, at Step 634 indicating its selection. The system then checks to see if the cursor has moved at Step 636. If so, the cursor is checked at Step 638 to see if it remains over the icon or its expanded descriptor. If not, the icon and its descriptor are unhighlighted, if necessary, at Step 640. If the cursor is over the icon the icon is highlighted, if necessary at Step 650 after which the system checks to see if the mouse button is released at Step 642. The system checks to see if the mouse button is released at Step 642 if no cursor movement is detected at Step 636. If the mouse button is not up at Step 642, the system continues to check for cursor movement at Step 636. Once the mouse button is released, the icon and descriptor are checked for highlighting at Step 644 and, if they remain highlighted, they are then unhighlighted at Step 646, after which the command associated with the icon is executed at Step 648. In the alternative, a dialog box requesting confirmation of execution can be displayed or a dialog box requesting additional information needed for command execution can be displayed. When this dialog box is displayed, the full description of the icon preferably continues to be displayed, to provide an additional clue as to which command was selected, even though the cursor may no longer be over the icon or the descriptor. If the icon is unhighlighted at Step 644 prior to the mouse button being released, the icon's function is not executed and the process continues at Step 606.

Figure 7:
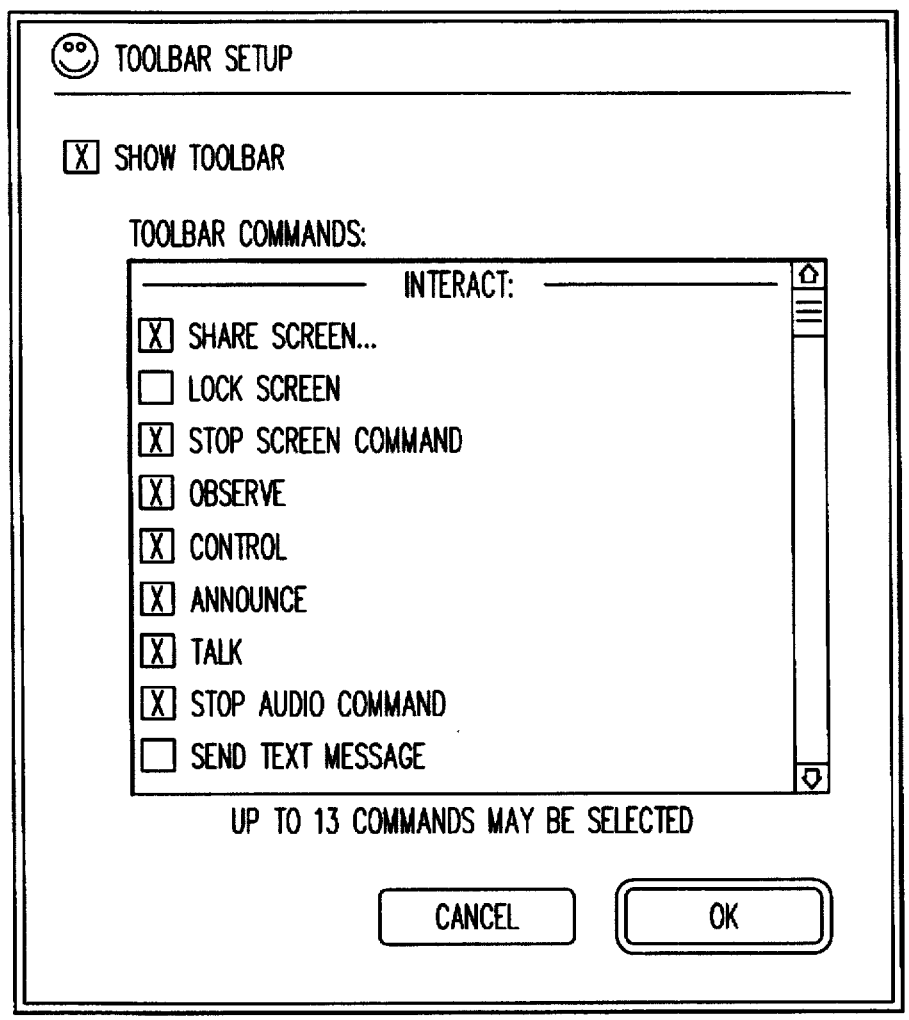
FIG. 7 is an illustration of a toolbar set up dialog box in accordance with another aspect of the invention.

Preferably, in a toolbar embodiment, for example, the toolbar can be configured in accordance with the desires of a user. That is, a user can select the icons that appear in a toolbar. The number of icon buttons that can be displayed may be limited by the width of a given workstation screen. In such a case, it is desirable to permit the user to select the particular icons that appear in the toolbar. A dialog box for selecting icons to appear in the toolbar is shown in FIG. 7. The particular selection mode by the user will determine the specific icons that are drawn in the toolbar at Step 600.

From the foregoing, it can be seen that the present invention provides a number of features associated with an arrangement of icons, icon toolbar, or like arrangement in any GUI operating environment. Although specifically described in the context of a networked system, it can be seen that the features of the invention have applicability in a much larger variety of computer environments wherein GUIs are utilized.

While exemplary embodiments of the invention have been described with respect to an arrangement of icons comprising a toolbar, it will be readily appreciated that the principles of the invention are not limited thereto. Rather, they are applicable to any user interface arrangement in which icons are placed proximate one another in a manner that could cause full textual descriptors to overlap or otherwise crowd each other. In this regard, the icons need not be contiguous, but can be spaced somewhat. Furthermore, the arrangement of icons need not be linear, as in a toolbar. They can be in a circular pattern, for example, or any other arrangement which locates them proximate one another.

The presently disclosed embodiments are therefore considered in all respects to be illustrative and not restrictive. The scope of the invention is indicated by the appended claims rather than the foregoing exemplary embodiments, and all changes that come within the meaning and range of equivalents thereof are intended to be embraced therein.

What is claimed is:

1. A graphical user interface which provides for user selection of a plurality of functions that can be performed via a computer, comprising:

a plurality of icons displayed on a display device and respectively associated with said plurality of user-selectable functions;

a plurality of associated icon descriptors displayed adjacent said icons, each descriptor containing at least a portion of a description of the function represented by an associated icon in a space that is aligned with the respective icon to which the description pertains;

a cursor that can be positioned by a user on said display device to designate one of said icons; and a display controller responsive to the positioning of said cursor on one of said icons for blanking the display of the descriptions for all the other icons and displaying the entire description of said one icon.

2. The graphical user interface of claim 1 wherein said plurality of icons are arranged to form a toolbar.

3. The graphical user interface of claim 1 wherein de-emphasizing the display of the descriptions for all the other icons includes blanking the display of the descriptions for all the other icons.

4. A graphical user interface for invoking a plurality of functions that can be performed in a computer, said graphical user interface comprising:

an arrangement of a plurality of icons; and a plurality of icon function descriptors located next to respective associated icons;

said icon function descriptors having a first display mode comprising a truncated text string that is confined to a width determined by a corresponding icon when no icon is designated by a cursor, and a second display mode comprising a full length text description of a function corresponding to the designated icon, which is displayed when an icon is designated by the cursor.

5. The graphical user interface claimed in claim 4, wherein the arrangement of a plurality of icons forms a toolbar.

6. The graphical user interface claimed in claim 4, wherein icon function descriptors for undesignated icons are blanked in the second display mode.

7. The graphical user interface of claim 4, wherein the truncated text string is comprised of at least one of a first portion of a full icon text description, an acronym, and a selected identifying word that can indicate an icon's function.

8. A graphical user interface in a computer for invoking a plurality of functions, said graphical user interface comprising:

a plurality of icons each of which has a corresponding icon description associated therewith, the icon description appearing within a space determined by a width of its associated icon;

a cursor for designating one of said icons; and means for expanding the icon text description associated with the designated icon to occupy an area greater than the width of the designated icon.

9. The graphical user interface claimed in claim 8, wherein the plurality of icons forms a toolbar.

10. The graphical user interface claimed in claim 8, wherein icon descriptions of undesignated icons are blanked in response to the designation of an icon.

11. A graphical user interface comprising:

an arrangement of a plurality of icons; and a plurality of corresponding icon descriptors each of which is arranged adjacent an associated icon;

wherein said icon descriptors appear in a truncated form so as to reside within a width of an associated icon, and wherein an icon descriptor expands to a full length text description of a function of an associated icon when the associated icon is designated.

12. The graphical user interface of claim 11 wherein the arrangement of a plurality of icons forms a toolbar.

13. The graphical user interface of claim 11 wherein the icon descriptors of undesignated icons disappear when an icon is selected.

14. A method for displaying a plurality of icons in a graphical user interface, which are respectively associated with different functions, comprising the steps of:

displaying the plurality of icons;

displaying a textual description of the function associated with each icon in a space adjacent the corresponding icon;

detecting the positioning of a cursor over one of said icons; and expanding the textual description of the function associated with said one icon.

15. The method for displaying a plurality of icons claimed in claim 14 wherein the step of displaying the plurality of icons includes displaying the plurality to form a toolbar.

16. The method of claim 14 further including the step of removing the display of the textual descriptions associated with the other icons in response to the detection of the cursor over said one icon.

17. The method of claim 14 wherein the space is no greater than the width of the icon.

18. The method of claim 14 wherein the step of expanding the textual description displays a text description that occupies a space greater than the width of said one icon.

\* \* \* \* \*